April 12, 1932.  P. J. FOBERT  1,853,344
BEARING BABBITTING MACHINE
Filed Jan. 16, 1930  5 Sheets-Sheet 3
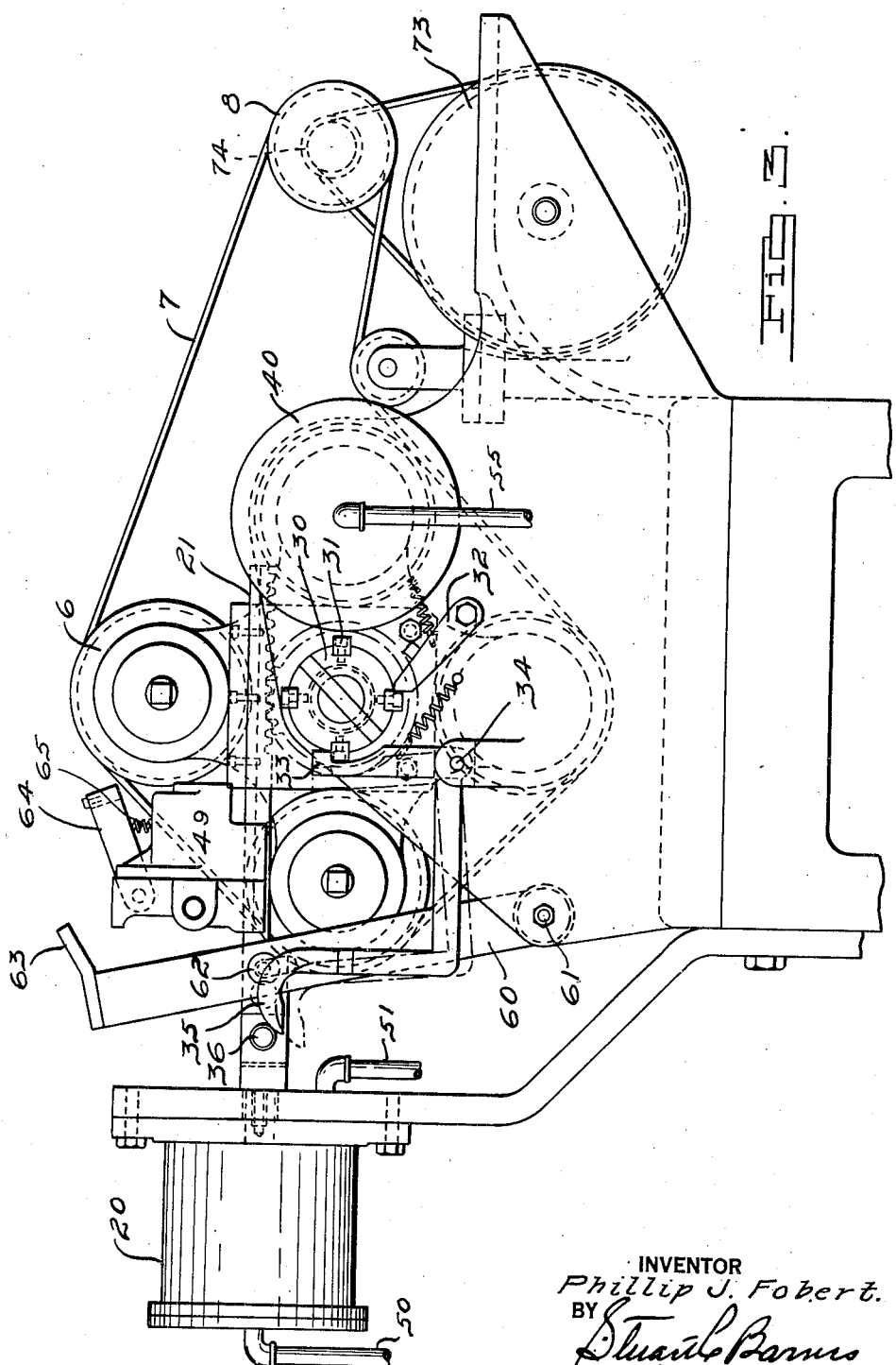
INVENTOR
*Phillip J. Fobert.*
BY
*Stuart C. Barnes*
ATTORNEY April 12, 1932.  P. J. FOBERT  1,853,344
BEARING BABBITTING MACHINE
Filed Jan. 16, 1930  5 Sheets-Sheet 4
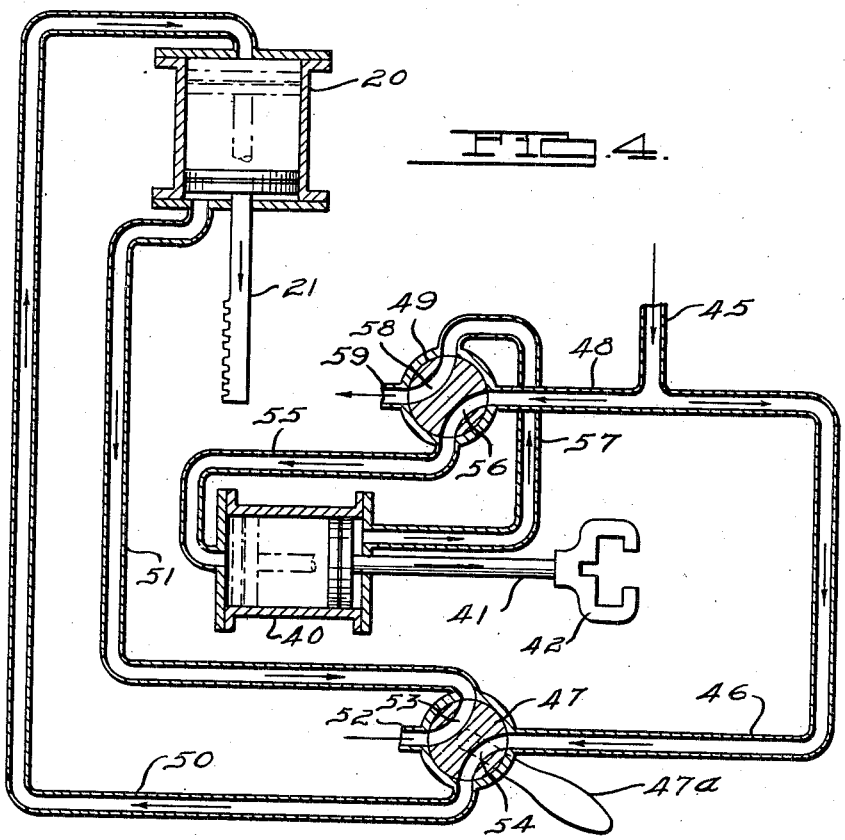
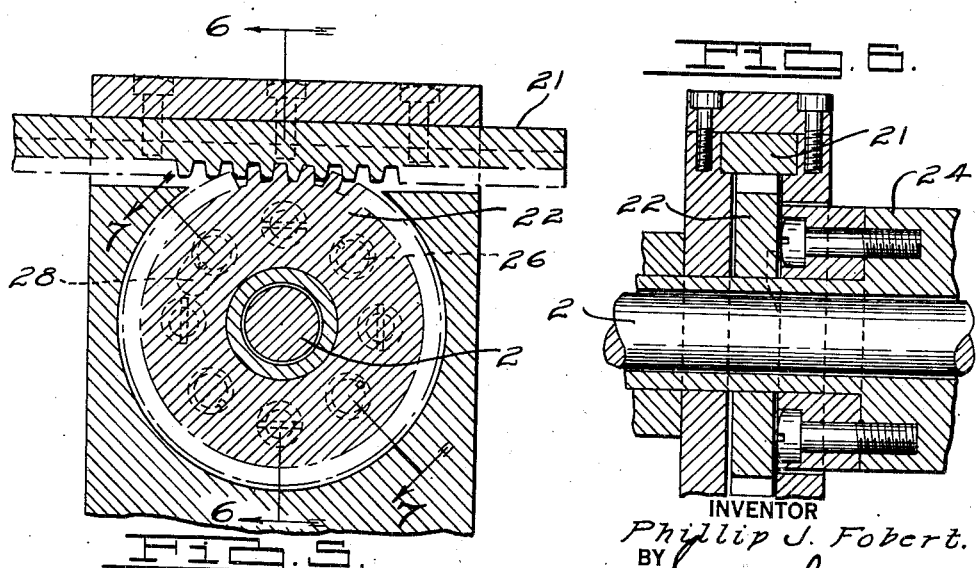
INVENTOR
Phillip J. Fobert.
BY
Stuart C. Barnes
ATTORNEY April 12, 1932.  P. J. FOBERT  1,853,344
BEARING BABBITTING MACHINE
Filed Jan. 16, 1930   5 Sheets-Sheet 5
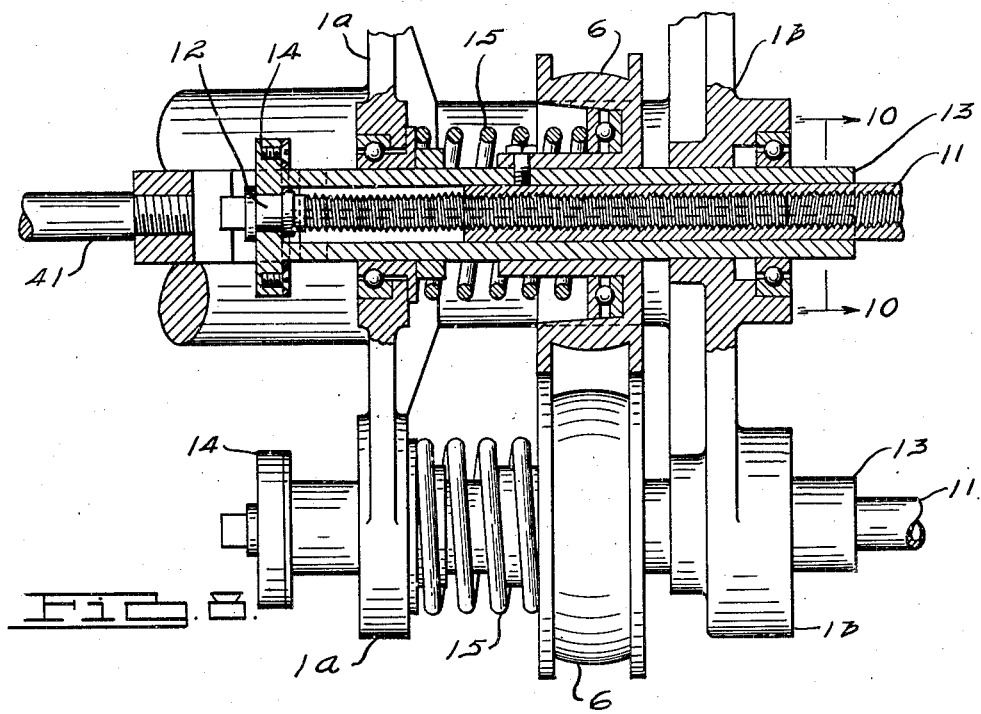
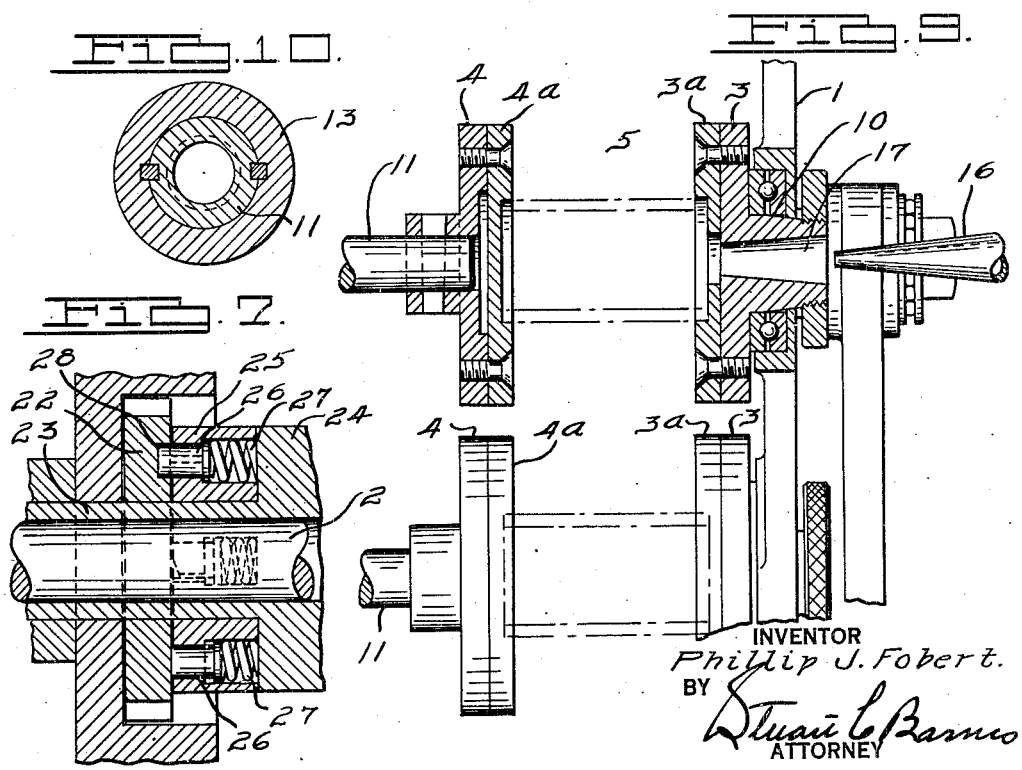

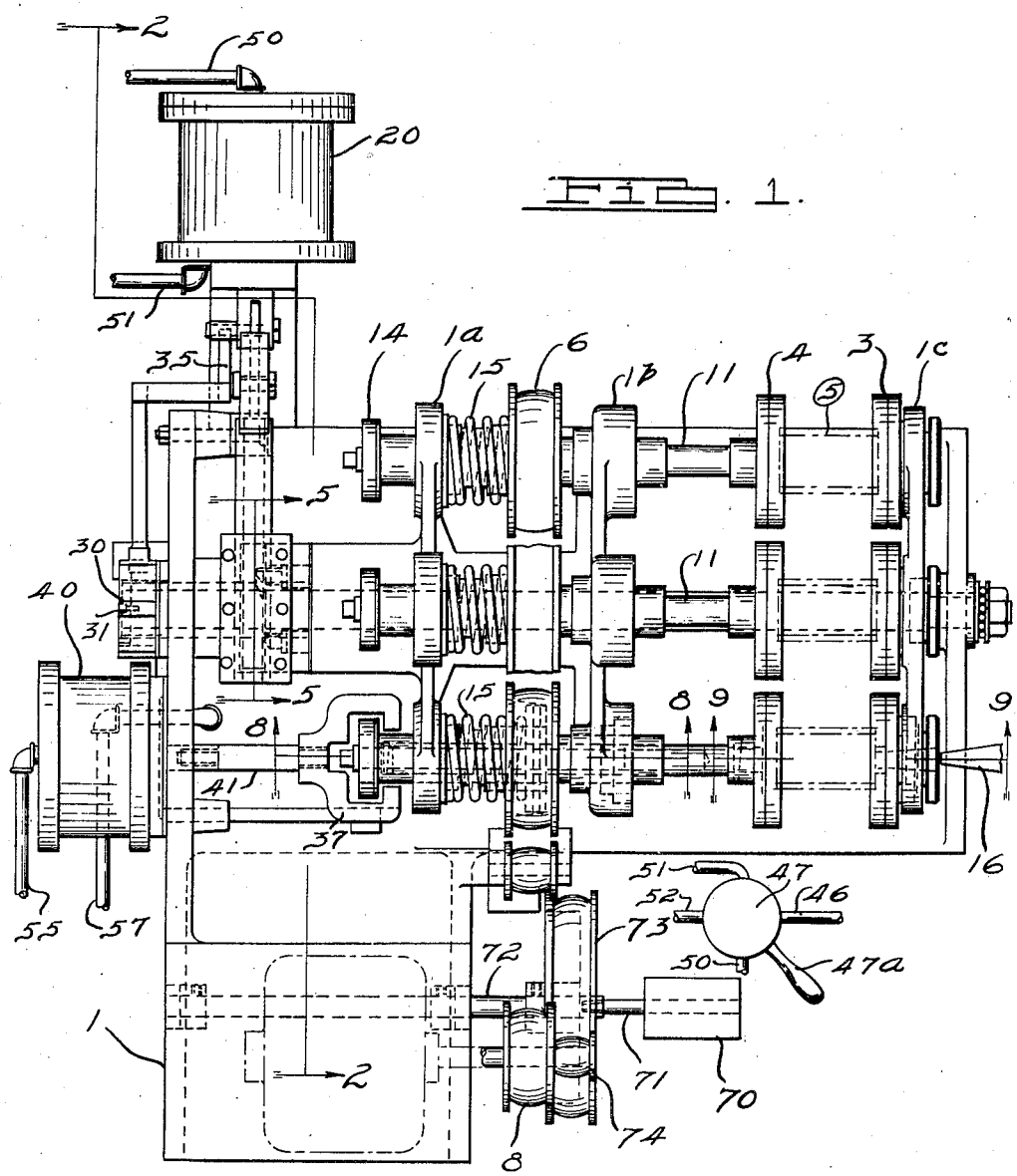

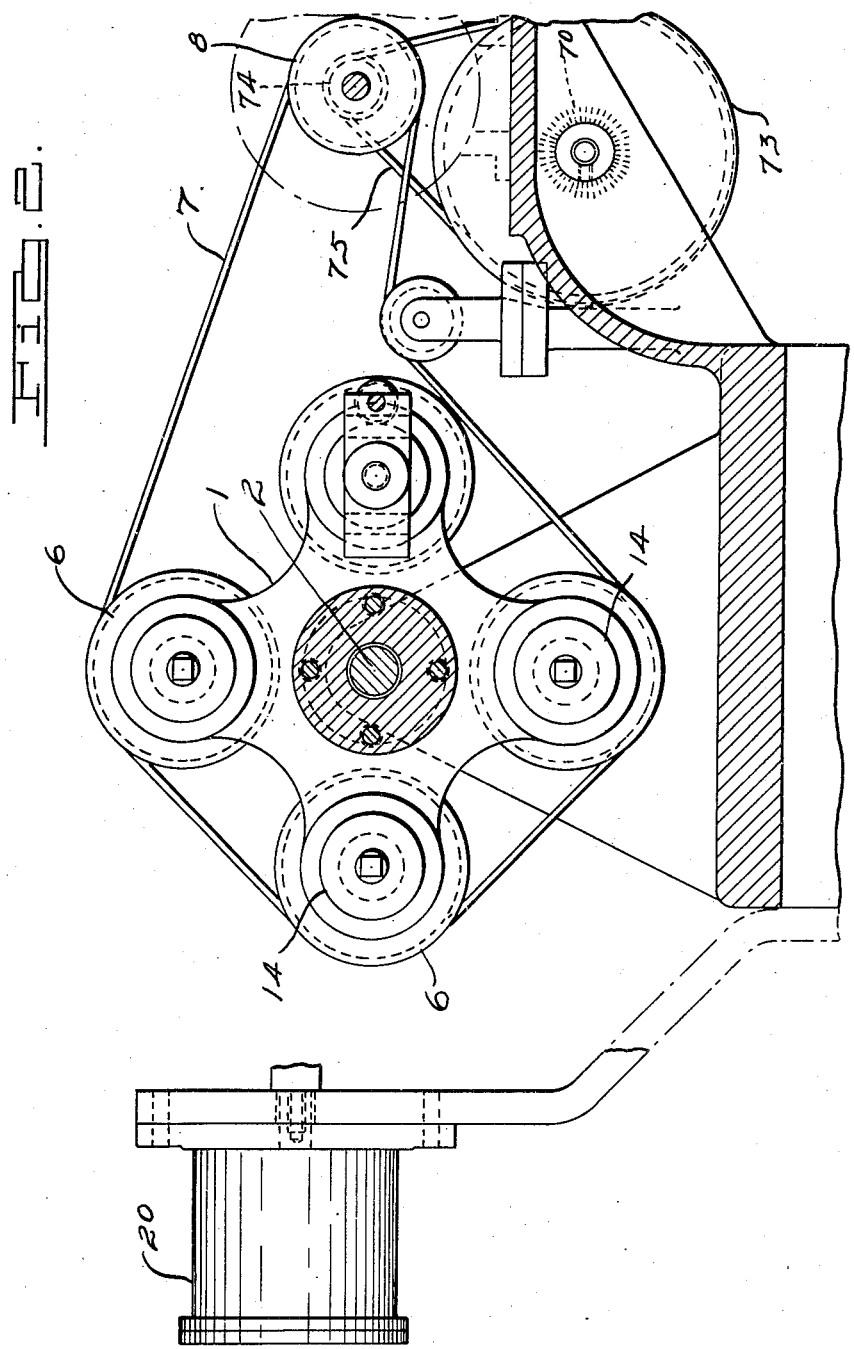

Patented Apr. 12, 1932

1,853,344

UNITED STATES PATENT OFFICE

PHILLIP J. FOBERT, OF DETROIT, MICHIGAN, ASSIGNOR TO DETROIT ALUMINUM & BRASS COMPANY, OF DETROIT, MICHIGAN, A CORPORATION OF MICHIGAN

BEARING BABBITTING MACHINE

Application filed January 16, 1930. Serial No. 421,321.

This invention relates to a machine for placing Babbitt linings in bearing backs. The bearing back, when the babbitt is placed therein is generally in the form of a cylinder and composed of any desirable metal, many times of bronze. The machine places a charge of molten metal in the cylindrical bearing back and then the back is subjected to a rotary action so that the molten metal is subjected to centrifugal action and sets upon the interior surface of the back.

The present invention is directed particularly to an improved machine wherein operation of several of the movable parts is effected by fluid-pressure actuating means; some movements are automatic. The result is a nicety of operation with a resultant saving of time. There are other features of the invention also covered herein, these features residing particularly in the arrangement and construction of the apparatus, and they will be appreciated better by a detailed description.

Fig. 1 is a plan view of a machine constructed in accordance with the invention, illustrating the bearing members held therein and showing the air cylinders employed for obtaining the requisite movements of the machine parts.

Fig. 2 is a sectional view taken on the line 2—2 of Fig. 1, showing the general arrangements of the movable bearing-carrying device.

Fig. 3 is a side view taken from the left-hand side of Fig. 1.

Fig. 4 is a diagrammatic view illustrating the system of conduits for the air under pressure and cylinders and pistons operated thereby.

Fig. 5 is a section taken on the line 5—5 of Fig. 1, showing the driving mechanism for the rotary bearing-carrying element.

Fig. 6 is a section taken on the line 6—6 of Fig. 5.

Fig. 7 is a section taken on the line 7—7 of Fig. 5, showing the ratchet drive.

Fig. 8 is an enlarged view taken substantially on line 8—8 of Fig. 1.

Fig. 9 is an enlarged view taken substantially on line 9—9 of Fig. 1.

Fig. 10 is a section taken on line 10—10 of Fig. 8 showing the adjustable shaft construction.

The machine comprises essentially a rotary element, the construction of which is in the nature of a spider, illustrated at 1 (Fig. 2) journaled on the shaft 2. The part 1, including several similar portions, some of which may be integral castings or separate castings, properly held together. These are illustrated in Fig. 1 by the characters $1a$, $1b$ and $1c$. The arms of the spider formation carry plates or disk-like elements 3 and 4 adapted to hold gripped between them a cylindrical bearing element 5. Also there are a number of pulleys 6, one for each bearing gripping element and over these pulleys runs a belt 7, which also runs over pulley 8 which is power driven, as by means of an electric motor as shown. By referring to Fig. 9 it will be noted that the bearing-holding plates 3 are journaled in the member 1 as shown at 10, while the plate 4 is mounted upon the end of shaft 11. The shaft 11 is hollow and provided with internal screw-threads for a portion of its length, (Fig. 8) and in the hollow portion is an adjusting screw-threaded rod 12. The shaft 11 is in a sleeve 13 provided with a head 14, and upon which is mounted the pulley 6 backed up by the spring 15. The rod may be fixed to the sleeve 13 by collars engaging opposite sides of the central portions of the head 14 as shown. The element 1, and the shaft parts carried thereby, is moved in the operation of the machine with step-by-step movement so that, as shown in Fig. 2, three of the bearing carriers are being rotated by the belt, while the fourth is free to permit of the discharge of a completed cylindrical bearing unit, and the reception of a bearing back to be babbitted. At the fourth or rest position, a nozzle 16 comes into alignment with the central aperture 17 of the bearing holder, and suitable means (not shown) is provided for discharging a charge of molten babbitt through the passageway 17 and into a bearing back. It is of course, necessary to provide for the opening up of the bearing retainers against the action of the springs 15, and for rotating the machine part 1, and the mechanism for this purpose will now be described.

There is a cylinder 20, within which there is a piston connected to a rack 21. This rack has teeth meshing with a gear 22. This gear wheel is freely rotatable on the extension 23 of the hub 24 of element 1 (Fig. 7). On the end of the hub there is placed a plate 25 provided with recesses and apertures and in the apertures are located cam-faced latches 26 backed up by springs 27. This forms a ratchet or one-way drive connection so that the gear 22 when moved in one direction rotates the frame element 1, but in the other direction the latches slip with the cam action out of the notches 28 in the gear. As shown in Fig. 5, there are four notches 28 and there is also an equal number of latch devices and the notches are elongated with respect to the latches for a purpose which will later appear.

When the piston in cylinder 20 moves the rack 21 from left to right (Fig. 3) the bearing holding structure is moved through one quarter of a turn. Suitable holding or indexing means are provided. On the end of the hub is an indexing device 30 provided with indexing projections 31, four in number for the present machine. A spring-pressed pawl 32 cooperates with these lugs. Another pawl or latch spring actuated as at 33 cooperates with the lugs. This pawl 33 is in the form of a bell-crank, pivoted at 34, and having a rounded end 35 adapted to be engaged by a projection which may be in the form of a roller 36 carried by the rack. As the rack moves from left to right there is a little lost play, permitting a limited movement due to the elongated slots 28 in the gear wheel, before the walls of the slots pick up the latches; during this time the roller 36 engages the curved surface 35 and depresses latch 33 to the position shown by dotted lines of 33, thus releasing a projection 31. As soon as the roller 36 moves over the surface 35, the pawl 33 snaps back to its full line position, the rack having now caused movement of the element 1, so that when the machine has made a quarter turn it is stopped by this latch, at which time the pawl 33 catches behind a lug 31. Thus the machine is held in position. On a reverse movement of the rack 21, there is no driving action and in this movement the pawl 33 is moved to disengaged position but snaps quickly back into engaged position without permitting the machine to move from its indexed position.

For the purpose of separating the plates 3 and 4 when they are at the inoperative position, there is provided an air cylinder 20, within which there is a piston having a piston rod 41, on the end of which is a yoke 42. The enlargements 14 line up with the yoke in the one at rest position, and when air is admitted to the cylinder to retract the yoke, the enlargement 14 is retracted. Refer to Fig. 8. This shows the shaft 11, and when the enlargement is pulled to the left, the sleeve 13 with the pulley thereon and shaft 11, also move to the left, thus compressing the spring 15. When the air is released and the piston moves in the other direction the shaft 11 moves back to the right.

The system of valves of the air line is diagrammatically shown in Fig. 4, wherein the air supply comes through a conduit 45, in a direct line 46 to a valve 47, in a direct line 48 to valve 49. The valve 47 is operated by the machine operator, by means of a suitable handle 47a. The valve may be moved to the position shown in Fig. 4, and this admits air in line 50 to the cylinder 20, and permits discharge of air from the cylinder through line 51 to the outlet port 52. The operator may shift the valve so that the port 53 joins the air lines 46 and 51, thus reversing the flow of air through the cylinder and permitting exhaust through line 50, through port 54 and exhaust outlet 52. In this manner the piston in cylinder 20 is always under control of the operator.

The normal position of valve 59 is as shown in Fig. 4, with the air maintained in cylinder 40 through the conduit 55. The valve can be shifted so that the air from conduit 48 passes through passageway 56 into conduit 57, thus admitting air to the opposite side of the cylinder to retract the yoke. At this time the conduit 55 connects to the atmosphere through the port 58, and exhaust 59.

The valve 49 is automatically operated by the movement of the parts controlled by the piston in cylinder 20. A rocker arm 60, pivoted at 61, has a connection with the gear rack by a pin and elongated slot, as illustrated at 62, and it has a valve engaging piece 63. The valve body 49 has a valve operating arm 64 acted upon by spring 65, which normally holds the valve in the position shown in Fig. 4. As the rack moves forward the part 63 strikes the arm 64, depresses it and trips the valve to reverse the air in the cylinder 40, and retract the yoke.

For the purpose of cleaning the interior of a cylindrical bearing back, a cleaning brush 70 is mounted upon the spindle 71, carried by a shaft 72 which has a pulley 73. The motor has a small belt pulley 74 and belt 75 runs over these pulleys to rotate the cleaner brush.

The operation is as follows: the operator stands in a convenient location, as, for example, near the "at rest" position of a bearing retainer and so that the handle 47a of valve 47, preferably, can be easily reached. We will assume that the machine is in operation, and a unit of bearing-carrying disks or plates has just received a new bearing back. A charge of molten babbitt is then forced through the nozzle 16 into the bearing back. The operator now shifts valve 47 so as to admit air into line 50. The rack 21, having been in the left-hand position, as Fig. 3 is viewed. This causes the rack to move from left to right, thus driving the rotary machine element 1 and its associated parts through one quarter of a turn, the pawls 33, 32 serving to index it at the end of this movement. This carries the unit which has just received the bearing back with the molten babbitt, to the lowermost position of Fig. 2, where it is rotated by the belt 7, and another set of bearing retaining plates move to the at rest position. At the end of the rack movement from left to right, approximately, the part 63 depresses the valve arm 64, thus reversing the air in cylinder 40 and retracting the yoke. This retracts the newly presented bearing plate 4 and the operator removes the completed bearing. A new bearing is then inserted, preferably, having been cleaned by slipping it over the brush 70, whereupon the operator reverses the hand-lever of valve 47 and causes the rack to move back to the position shown in Fig. 3. At this time the rack is inoperative, in so far as rotating the machine is concerned, as the gear does not drive the same due to the spring-pressed latches 26. As soon as the rack starts its back movement, valve lever 64 is released so that the air is reversed and the cylinder 40 thus advancing the yoke and permitting the plate 4 to advance under action of spring 15 and grip the newly presented bearing back. The machine is now at the starting point again, and the next action is to supply the molten babbitt through the nozzle and repeat the cycle of operation.

The machine is capable of taking bearings of different sizes, and for this purpose the bearing-engaging rings 3a and 4a (Fig. 9) are replaceable for bearings of different diameter. The bearings may vary in length, and while the springs 15 may be capable of taking care of slight variations in length, yet a further adjustment is provided in the structure shown in Fig. 8. Here it will be seen that by rotating the screw-threaded shaft 12 the shaft 11 may be fed in or out to effect proper adjustment.

Claims:

1. In a machine for babbitting the interior of bearing backs, a rotatable carrier device having a plurality of bearing supporting elements, a rack bar, a one way drive connection between the bar and carrier, means for reciprocating the rack bar to rotate the carrier with step by step movement, indexing means for the carrier arranged to hold the carrier from rotary movement in both directions comprising a latch, means actuated by the movement of the rack bar for releasing the latch to permit carrier movement, and a lost play connection between the rack bar and the carrier in its driving direction to permit rack bar movement and release the latch prior to movement of the carrier.

2. In a machine for applying babbitt to the interior of bearing backs, a rotary carrier, bearing support elements thereon, a reciprocable rack bar, a one way drive connection between the bar and carrier so that reciprocation of the rack bar moves the carrier with step by step movement, a latch for stopping the carrier in a step movement, means for locking the carriage against reverse movement, cam means associated with the rack bar for releasing the latch to permit carrier movement, and a lost play connection between the rack bar and carrier to permit rack bar movement in its driving movement, to first release the latch prior to carrier movement.

3. In a machine for applying babbitt to the interior of bearing backs, a rotary carrier, a plurality of bearing supporting elements thereon, a gear having a one way drive connection with the carrier, reciprocable rack operating on the gear, indexing means for the carrier comprising a pawl and a latch for indexing and holding the rotary carrier from rotary movement in both directions, and means associated with the rack bar for releasing the latch to permit carrier movement.

4. In a machine for applying babbitt to the interior of bearing backs, a rotary carrier, a plurality of bearing supporting elements thereon, a rack having a one way drive connection with the carrier, a cylinder with piston therein connected to the rack, air supply conduits, a valve for controlling the entrance of air into opposite ends of the said cylinder, a second cylinder with piston actuating a bearing supporting element to permit discharge and reception of the bearing element, air supply conduits leading into the ends of the second cylinder, a control valve for the last-mentioned conduits, and means associated with the first mentioned piston for automatically acting upon the second named valve to actuate the bearing supporting elements during a period of rest of the rotary carrier.

5. In a machine for applying babbitt to the interior of bearing backs, a rotary carrier, a plurality of bearing supporting elements thereon, a rack having a one way drive connection with the carrier, a cylinder with piston therein connected to the rack, air supply conduits, a valve for controlling the entrance of air into opposite ends of the said cylinder, a second cylinder with piston actuating a bearing supporting element to permit discharge and reception of the bearing elements, air supply conduits leading into the ends of the second cylinder, a control valve for the conduits leading to the second cylinder, and means associated with the first mentioned piston for automatically acting upon the valve of the second cylinder to actuate the bearing supporting elements during a period of rest of the rotary carrier, the said automatic means releasing the valve and reversing the air in the second cylinder automatically upon reverse movement of the first mentioned piston.

6. In a bearing making machine having a movable carrier element with rotary bearing holding devices thereon, a shaft upon which a holding device is mounted, a sleeve over the shaft and associated in a driving relation with the shaft; means for rotating the sleeve, means for moving the sleeve and shaft axially to permit discharge and reception of a bearing element, and additional means for adjusting the shaft axially independently of the sleeve to accommodate for various sized bearings.

7. In a bearing machine having a movable carrier element with rotary bearing holding devices thereon, a shaft upon which a holding device is mounted, a sleeve over the shaft and associated in a driving relation with the shaft, means for rotating the sleeve, means for moving the sleeve and shaft axially to permit discharge and reception of a bearing element, and means for adjusting the shaft axially as regards the sleeve to accommodate for various sized bearings, said last named means comprising a screw threaded rod having a threaded engagement with the shaft and normally immovable with respect to the sleeve.

In testimony whereof I have affixed my signature.

PHILLIP J. FOBERT.